United States Patent Office 3,423,362
Patented Jan. 21, 1969

3,423,362
METHOD OF MANUFACTURE OF HIGH MOLECULAR WEIGHT THERMOPLASTIC SILICIC ACID POLYESTERS
Hans-Joachim Kötzsch, Rheinfelden, and Roshdy M. Ismail, Spich, Germany, assignors to Dynamit Nobel Aktiengesellschaft, a corporation of Germany
No Drawing. Filed Sept. 11, 1967, Ser. No. 666,930
Claims priority, application Germany, Sept. 14, 1966,
D 51,089
U.S. Cl. 260—47        14 Claims
Int. Cl. C08g 31/02

ABSTRACT OF THE DISCLOSURE

There is disclosed a process for the manufacture of thermoplastic silicic acid polyesters of high molecular weight having the formula:

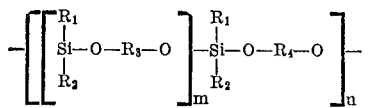

wherein $R_1$ and $R_2$ each represent hydrogen, alkyl or alkenyl ($R_1$ and $R_2$ can be the same or different), $R_3$ is arylene, $R_4$ as alkylene, cycloalkylene or arylene and may contain hetero atoms, $m$ is a whole number having a value of from 1 to 100 and preferably 1 to 50, and $n$ is a whole number having a value of from 1 to 200 and preferably 2 to 100. The process is carried out by a silicic acid ester silazane of the formula:

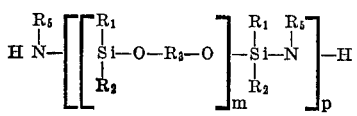

wherein $m$, $R_1$, $R_2$ and $R_3$ are as above defined and $R_5$ represents hydrogen, alkyl, cycloalkyl, or aryl, and $p$ is a whole number having a value of from 1 to 200 with an equimolar amount of a compound of the formula:

wherein $R_4$ is as above defined at a temperature of from 20 to 440° C.

The resulting compounds are characterized by their high thermostability and are suitable for use as varnishes, coatings, insulating injection molding, pressing and casting compounds.

This invention relates to a method of preparing high molecular weight thermoplastic silicic acid esters.

More particularly it relates to the preparation of high molecular weight of thermoplastic silicic acid esters having the formula:

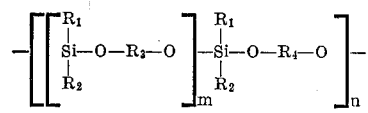

wherein $R_1$ and $R_2$ each represent hydrogen, alkyl or alkenyl ($R_1$ and $R_2$ can be the same or different), $R_3$ is arylene, $R_4$ is alkylene, cycloalkylene or arylene and may contain hetero atoms, $m$ is a whole number having a value of from 1 to 100 and preferably 1 to 50, and $n$ is a whole number having a value of from 1 to 200 and preferably 2 to 100.

It is in the prior art to manufacture silicic acid polyesters by the condensation of equimolecular amounts of dimethyldichlorosilane and a bivalent phenol in the presence of a basic hydrogen chloride acceptor and solvent, if desired. The known process, however, has the disadvantage that residues of hydrolyzable chlorine are left in the product, just as they are in the case of where the reaction is carried out in the presence of basic catalysts.

It is furthermore in the prior art to condense hexamethylcyclotrisilazane with an aromatic dihydroxy compound at reduced pressure and elevated temperature, but in this case the comparatively high molecular weight of the condensation product is disadvantageous. Furthermore, the manufacture and purification of the monomeric silazane starting material is very expensive.

In accordance with the invention, it has now been found that thermoplastic silicic acid polyesters of high molecular weight having the formula:

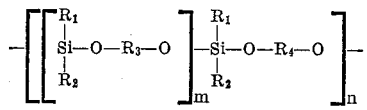

wherein $R_1$ and $R_2$ each represent hydrogen, alkyl or alkenyl ($R_1$ and $R_2$ can be the same or different), $R_3$ is arylene, $R_4$ is alkylene, cocloalkylene or arylene and may contain hetero atoms, $m$ is a whole number having a value of from 1 to 100 and preferably 1 to 50, and $n$ is a whole number having a value of from 1 to 200 and preferably 2 to 100, can be readily and economically obtained by reacting a silicic acid ester silazane of the formula:

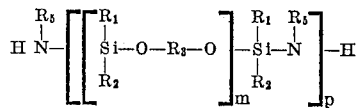

wherein $m$, $R_1$, $R_2$ and $R_3$ are as above defined, and $R_5$ represents hydrogen, alkyl, cycloalkyl or aryl, and $p$ is a whole number having a value of from 1 to 200 and preferably of 1 to 100, with an equimolar amount of a compound of the formula:

in which $R_4$ is as above defined, under reduced pressure if desired, at a temperature of 20 to 440° C. and preferably 200 to 400° C. in the presence, if desired, of a regulator and/or condensation catalyst. In the reaction it is preferable to use the temperatures above the softening point of the starting products.

The process of the invention results in the production of products having higher molecular weights then those which have been obtained by the prior art methods and consequently in products having better mechanical properties, the said products being free of hydrolyzable silicon-chlorine bonds.

The silicic acid ester silazanes employed as starting materials can be manufactured for example by a process that is not claimed herein by the condensation of a bivalent phenol with an excess of a dihalogen silane such as dimethyldichlorosilane, dichlorosilane, hydrogen methyl dichlorosilane, methyl vinyl dichlorosilane, diethyl dichlorosilane, or mixtures thereof using therefor many different stoichiometric ratios, in the presence of an amine catalyst or in the presence of an organic halogen hydride binding agent followed by exchange of the residual hydrolyzable chlorine for amino, alkyl, cycloalkyl or arylamino groups by reaction with excess ammonia and/or a primary, cycloaliphatic or aromatic amine preferably in the presence of an inert solvent at a temperature of 20 to 180° C.

Instances of dihydroxy compounds which can be employed in the condensation reaction with the silicic acid ester silazanes include:

(1) Diols derived from aliphatic compounds and which also include poly compounds, cycloaliphatic compounds, as well as polyethers and polyesters having terminal hydroxyl groups, such as ethylene glycol, 1,2- and 1,3-propylene glycol, 1,4-butanediol, 1,4-butenediol, 1,4-butinediol, 1,5-pentenediol, 1,6-hexanediol, 1,4-cyclohexanediol, diethylene glycol, triethylene glycol, polyethylene glycols having molecular weights of up to 5000, reaction products formed by reaction of dimethylterephthalate with stoichiometrically excess amounts of glycols or polyglycols.

(2) Bivalent phenols, such as:
resorcinol
hydroquinone
bis-(2-hydroxyphenyl)-methane
bis-(4-hydroxyphenyl)-methane
bis-(4-hydroxy-3-methylphenyl)-methane
bis-(4-hydroxy-3,5-dichlorophenyl)-methane
bis-(4-hydroxy-3,5-dibromophenyl)-methane
bis-(4-hydroxxy-3,5-difluorophenyl)-methane
1,1-bis-(4-hydroxyphenyl)-ether
2,2-bis-(4-hydroxyphenyl)-propane
2,2-bis-(3-hydroxyphenyl)-propane
2,2-bis-(4-hydroxyphenyl)-butane
2,2-bis-(4-hydroxyphenyl)-4-(methyl)-pentane
2,2-bis-(4-hydroxy-3-methyl-phenyl)-propane
2,2-bis-(4-hydroxy-3-chlorophenyl)-propane
2,2-bis-(4-hydroxy-3,5-dichlorophenyl)-propane
2,2-bis-(4-hydroxy-3,5-dibromophenyl)-propane
bis-(4-hydroxyphenyl)-phenylmethane
bis-(4-hydroxyphenyl)-phenylmethylmethane
bis-(4-hydroxyphenyl)-diphenylmethane
bis-(4-hydroxyphenyl)-(4-methylphenyl)-methane
1,1-bis-(4-hydroxyphenyl)-1-(3-methylphenyl)-propane
1,1-bis-(4-hydroxyphenyl)-2,2,2-trichloroethane
bis-(4-hydroxyphenyl)-(4-chlorophenyl)-methane
1,1-bis-(4-hydroxyphenyl)-cyclohexane
bis-(4-hydroxyphenyl)-cyclohexylmethane
4,4'-dihydroxydiphenyl
3,3',5,5'-tetramethyl-4,4'-dihydroxydiphenyl
dihydroxynaphthaline
4,4'-dihydroxydiphenylsulfone
4,4-dihydroxydiphenylether
4,4'-dihydroxybenzophenone.

(3) Hetero-organic compounds having 2 hydroxy groups, such as silane diols and siloxane diols, as for example, dihydroxypolydimethylsiloxane, $\alpha,\omega$-di-(3-hydroxypropyl)-dimethyldisiloxane, or their corresponding polysiloxanes.

Mixtures of the above set out bivalent hydroxy compounds can also be used.

The silicic acid ester silazanes are reacted with the dihydroxy compounds in equimolar amounts. In accordance with the invention compounds having one hydroxyl group can be employed as regulators, if desired, to control the molecular weight of the resulting polyesters. The following compounds, among others, can be used as regulators, ethanol, isopropanol, n-octanol, 2-alkoxy-ethanols, benzyl alcohol, cinnamic alcohol, phenol, 2,4,6-tri-tert. butylphenol, etc. The amount of the regulator employed is governed as noted above, by the desired molecular weight of the silicic acid polyester.

Condensation catalysts suitable for use in the process of the present invention include hydrides, amides and salts of organic acids, alcoholates and phenolates of alkali metals and/or alkaline earth metals. The condensation catalysts can be used in quantities of 0.1 to 10 mole percent and preferably 1 to 3 mole-percent, with reference to the quantity of silicic acid ester silazane. However, the reaction takes place sufficiently rapidly without the addition of such catalysts.

The reaction can also be carried out in an inert solvent. Suitable inert solvents for the reaction of the present invention include both aliphatic and aromatic hydrocarbons as well as simple and cyclic ethers. Instances of aliphatic hydrocarbons include both homogeneous or mixed compounds, such as isooctane and benzine fractions, as for example those having a boiling range of from 120 to 180° C. Benzene, toluene and xylene are examples of appropriate aromatic hydrocarbons. Ethers that can be used as solvents in carrying out reactions are, for example, diisopropyl ether, diisoamyl ether, diphenyl ether, 1,4-dioxane and the like. From the above listing of suitable ethers it can be seen that both aliphatic and aromatic, open-chain and cyclic ethers can be used.

The special advantage of the process of the invention lies in the small amount of amines or ammonia which is split off, the same being removed relatively quickly and simply. Thus the possibility is created of producing in a simple and controllable manner silicic acid polyesters of high molecular weight, and particularly silicic acid polycoesters having periodically alternating segments, while the properties of the polyesters can be varied to a great extent by the selection of the dihydroxy compounds.

The polymers produced are characterized by their high thermostability and can be used, for example, as varnishes, coatings, insulating injection-molding compounds, and pressing compounds, high temperature thermoplastics, and casting resins, and can be used in this connection in combination with other suitable thermoplastics and with fillers, pigments and dyes.

The following examples serve to illustrate the invention but are in no wise construed as a limitation thereof.

EXAMPLE 1

(a) Manufacture of the starting material 14.3 g. of dimethyldichlorosilane and 22.8 g. of 2,2-bis-(4-hydroxyphenyl)-propane (diane), in a molar ratio of 11:10, were boiled in 50 ml. of anhydrous benzene in the presence of 0.5 ml. of dimethylaniline for 6 hours, with refluxing, until the evolution of HCl had ceased. Ammonia was then introduced into the solution at 60° C. for 2 hours, $NH_4Cl$ thereby precipitating out. After 2 hours of boiling the $NH_4Cl$ was removed by suction filtering and the filtrate was concentrated by evaporation. In this manner 29 grams of polydimethylsilazanedianyl polyester was isolated, which had a reduced viscosity of 1.12 as determined in a solution of 0.5% by weight in toluene.

(b) Manufacture of the polyester 15 g. of the aforesaid polydimethylsilazanedianyl polyester having a nitrogen content of 0.5% was fused at 60° C. and mixed with 1.14 g. of diane. The mixture was heated for 150 minutes at 380° C., becoming increasingly viscous and finally becoming very viscous. A yellow-colored, glassy polymer was obtained, which softened at 310–340° C., and which had a reduced viscosity of 1.23 when measured in a solution of 0.5% by weight in dimethylformamide at 25° C. Thermogravimetric analysis established that decomposition began in air at 480° C.

EXAMPLE 2

12.1 g. of polydimethylsilazanedianyl ester, which was prepared as disclosed in Example 1a (dichlorosilane and diane were reacted in a molar ratio of 5:4) and which had a nitrogen content of 1.16%, were dissolved in absolute benzene, and, after the addition of 3.5 g. of tetrachlorodiane (chlorine in the ortho position in relation to the OH group) and 1 mg. of sodium amide, the mixture was boiled for 2 hours, with slow distillation of the solvent, until the evolution of ammonia had been completed. Concentration by evaporation produced a hard polymer that softened between 170° C. and 184° C. The reduced viscosity, as determined in a solution of 0.5 wt. percent in dimethyl formamide at 25° C. amounted to 0.9.

We claim:
1. A method of preparing a high molecular weight thermoplastic silicic acid polyester of the formula:

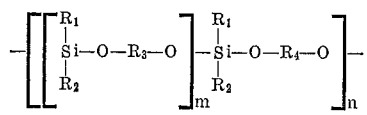

wherein $R_1$ and $R_2$ are each a member selected from the group consisting of hydrogen, alkyl and alkenyl, $R_3$ is arylene, $R_4$ is a member selected from the group consisting of alkylene, cycloalkylene, arylene and such groups containing hetero atoms, $m$ is a whole number of from 1 to 100 and $n$ is a whole number of from 1 to 200, which comprises reacting a silicic acid ester silazane corresponding to the formula:

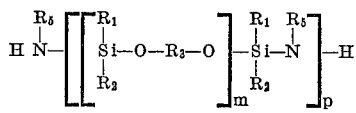

wherein $R_1$, $R_2$, $R_3$ and $m$ are as above defined, R is a member selected from the group consisting of hydrogen, alkyl, cycloalkyl and aryl and $p$ is a whole number of from 1 to 200 with an equimolar amount of a compound corresponding to the formula:

wherein $R_4$ is as above defined at a temperature of from about 20 to about 440° C.

2. A method according to claim 1 which comprises effecting said reaction at a temperature of 200 to 400° C.

3. A method according to claim 1 which comprises effecting said reaction in the presence of a condensation catalyst selected from the group consisting of alkali metal and alkaline earth metal hydrides, amides, alcoholates, phenolates and salts of organic acids.

4. A method according to claim 3 which comprises utilizing said catalyst in an amount of from 0.1 to 10 mol percent referred to said silicic acid ester silazane.

5. A method according to claim 1 which comprises effecting said reaction in the additional presence of a member selected from the group consisting of aliphatic and aromatic compounds containing one hydroxyl group.

6. A method according to claim 5 wherein said compound containing one hydroxyl group is a member selected from the group consisting of ethanol, isopropanol, n-octanol, 2-alkoxyethanol, benzyl alcohol, cinnamic alcohol, phenol and 2,4,6-tritert. butylphenol.

7. A method according to claim 1 which comprises effecting said reaction in the presence of a condensation catalyst selected from the group consisting of alkali metal and alkaline earth metal hydrides, amides, alcoholates, phenolates and salts of organic acids, and a compound selected from the group consisting of ethanol, isopropanol, n-octanol, 2-alkoxy-ethanol, benzyl alcohol, cinnamic alcohol, phenol and 2,4,6-tri-tert. butylphenol.

8. A method according to claim 1 wherein $m$ is a whole number from 1 to 50.

9. A method according to claim 1 wherein $n$ is a whole number from 2 to 100.

10. A method according to claim 1 wherein said silicic acid ester silazane is obtained by condensing an aryl dihalogen silane with a bivalent phenol in the presence of an organic hydrogen halide binding agent and thereafter reacting the preliminary condensation product thereby obtained with an excess of at least one member selected from the group consisting of ammonia, and primary cycloaliphatic and aromatic amines.

11. A method according to claim 1 wherein said compound $HO-R_4-OH$ is a member selected from the group consisting of aliphatic and cycloaliphatic diols.

12. A method according to claim 1 wherein $p$ is a whole number of from 1 to 100.

13. A method according to claim 1 wherein said silicic acid ester silazane is polydimethylsilazanedianyl polyester and said $HO-R_4-OH$ compound is diane.

14. A method according to claim 1 wherein said silicic acid ester silazane is polydimethylsilazanedianyl ester and said $HO-R_4-OH$ compound is tetrachlorodiane.

References Cited

UNITED STATES PATENTS 3,043,798  7/1962  Boyer et al. _____ 260—46.5
3,346,515  10/1967  Curry _____ 260—2

WILLIAM H. SHORT, *Primary Examiner.*

M. GOLDSTEIN, *Assistant Examiner.*

U.S. Cl. X.R.

260—46.5, 32.6